(12) United States Patent
Miura et al.

(10) Patent No.: US 10,022,708 B2
(45) Date of Patent: Jul. 17, 2018

(54) EXHAUST GAS PURIFICATION CATALYST FOR MOTOR VEHICLE

(71) Applicant: TOYOTA JIDOSHA KABUSHIKI KAISHA, Toyota-shi, Aichi-ken (JP)

(72) Inventors: Masahide Miura, Toyota (JP); Tetsuhiro Hirao, Toyota (JP); Tadashi Suzuki, Nagakute (JP); Toshitaka Tanabe, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 250 days.

(21) Appl. No.: 14/916,862

(22) PCT Filed: Sep. 3, 2014

(86) PCT No.: PCT/IB2014/001687
§ 371 (c)(1),
(2) Date: Mar. 4, 2016

(87) PCT Pub. No.: WO2015/033204
PCT Pub. Date: Mar. 12, 2015

(65) Prior Publication Data
US 2016/0214092 A1 Jul. 28, 2016

(30) Foreign Application Priority Data

Sep. 6, 2013 (JP) .................................. 2013-185497

(51) Int. Cl.
*B01J 23/00* (2006.01)
*B01J 23/10* (2006.01)
(Continued)

(52) U.S. Cl.
CPC .......... *B01J 23/894* (2013.01); *B01D 53/945* (2013.01); *B01J 23/002* (2013.01); *B01J 37/036* (2013.01);
(Continued)

(58) Field of Classification Search
CPC ...... B01J 23/894; B01J 23/002; B01J 37/036; B01J 37/0234; B01J 2523/00;
(Continued)

(56) References Cited

U.S. PATENT DOCUMENTS

| 5,915,951 A | 6/1999 | Euzen et al. |
| 2007/0117718 A1 | 5/2007 | Ito et al. |

(Continued)

FOREIGN PATENT DOCUMENTS

| CN | 102341174 A | 2/2012 |
| JP | 09-173850 A | 7/1997 |

(Continued)

OTHER PUBLICATIONS

International Search Report for PCT/162014/001687 dated Dec. 23, 2014 [PCT/ISA/210].

(Continued)

*Primary Examiner* — Haytham Soliman
(74) *Attorney, Agent, or Firm* — Sughrue Mion, PLLC

(57) ABSTRACT

An exhaust gas purification catalyst having a base and a catalytic coating layer formed thereon includes an alumina support, a platinum-group metal, an iron oxide-zirconia-based composite oxide, and a lanthanoid oxide in the same catalytic coating layer.

5 Claims, 2 Drawing Sheets

(51) Int. Cl.
*B01J 23/89* (2006.01)
*B01J 37/03* (2006.01)
*B01D 53/94* (2006.01)
*B01J 37/02* (2006.01)

(52) U.S. Cl.
CPC ........ *B01D 2255/2061* (2013.01); *B01D 2255/2063* (2013.01); *B01D 2255/20715* (2013.01); *B01D 2255/20738* (2013.01); *B01D 2255/40* (2013.01); *B01D 2255/908* (2013.01); *B01J 37/0234* (2013.01); *B01J 2523/00* (2013.01); *Y02A 50/2324* (2018.01); *Y02T 10/22* (2013.01)

(58) Field of Classification Search
CPC ........ B01J 2255/2063; B01D 53/945; B01D 2255/20715; B01D 2255/908; B01D 2255/2061; B01D 2255/2063; B01D 2255/20738; B01D 2255/40; Y02A 50/2324; Y02T 10/22
USPC ........................................ 502/303
See application file for complete search history.

(56) References Cited

U.S. PATENT DOCUMENTS

| | | |
|---|---|---|
| 2012/0027654 A1 | 2/2012 | Mikita et al. |
| 2013/0143732 A1 | 6/2013 | Aoki |
| 2015/0080211 A1 | 3/2015 | Miura et al. |

FOREIGN PATENT DOCUMENTS

| | | |
|---|---|---|
| JP | 2007-136339 A | 6/2007 |
| JP | 2009-285619 A | 12/2009 |
| JP | 2013-116446 A | 6/2013 |
| WO | 2010/101219 A1 | 3/2010 |
| WO | 2013/162029 A1 | 10/2013 |

OTHER PUBLICATIONS

Written Opinion for PCT/162014/001687 dated Dec. 23, 2014 [PCT/ISA/237].

Japanese Office Action for 2013-185497 dated Jul. 7, 2015.

EXHAUST GAS PURIFICATION CATALYST FOR MOTOR VEHICLE

CROSS REFERENCE TO RELATED APPLICATIONS

This application is a National Stage Entry of International Application No. PCT/IB2014/001687 filed Sep. 3, 2014, claiming priority based on Japanese Patent Application No. 2013-185497 filed Sep. 6, 2013, the contents of all of which are incorporated herein by reference in their entirety.

BACKGROUND OF THE INVENTION

1. Field of the Invention

The invention relates to an exhaust gas purification catalyst including an iron oxide-zirconia-based composite oxide.

2. Description of Related Art

Exhaust gases discharged from the internal combustion engines of motor vehicles and the like contain harmful gases such as carbon monoxide (CO), nitrogen oxides (NOx), and unburned hydrocarbons (HC). In exhaust gas purification catalysts (so-called ternary catalysts) for decomposing such harmful gases, ceria-zirconia composite oxides and the like having oxygen storage capacity (OSC) are used as promoters. Substances (oxygen storage materials) having OSC absorb and release oxygen to thereby control the air-fuel ratio (A/F) in the microscopic spaces, and have the effect of inhibiting the degree of cleaning from decreasing with fluctuations in exhaust gas composition.

Cerium, which is often contained in composite oxides having OSC, is not only expensive but also becoming less stably available due to the worsening of the recent procuration situation. Accordingly, exhaust gas purification catalysts including iron as an oxygen storage material are being investigated and developed for the purpose of reducing the use amount of cerium.

For example, Japanese Patent Application Publication No. 2007-136339 (JP 2007-136339 A) discloses particles for catalytic use which function to storage and release oxygen and which each include a core including the oxide of Fe having a valence of 3 as a main component and a layer formed on the peripheral surface of the core, the layer being constituted of an iron compound that is a solid solution of a divalent element, other than iron, in the oxide of iron having a valence of 3. Japanese Patent Application Publication No. 2009-285619 (JP 2009-285619 A) discloses a catalyst for exhaust gas purification which is characterized in that a large number of iron oxide particles are dispersedly contained in the catalyst layer, at least some of the iron oxide particles are fine iron oxide particles having a particle diameter of 300 nm or smaller, the fine iron oxide particles being in contact with cerium-containing oxide particles having oxygen storage/release capacity, and the areal proportion of the fine iron oxide particles to the total area of the iron oxide particles being 30% or higher.

$Fe_2O_3$ has OSC due to the oxidation/reduction. Meanwhile, iron undesirably reacts with other catalyst materials such as, for example, ceria-zirconia solid solutions and alumina. For that reason, persons skilled in the art have recognized that oxygen storage materials utilizing $Fe_2O_3$ are prone to decrease in oxygen storagecapacity and that catalysts including such oxygen storage materials are prone to decrease in cleaning performance and thereby have poor durability. The inventors addressed this problem and previously succeeded in greatly improving the durability by adding $ZrO_2$, $La_2O_3$, etc. to $Fe_2O_3$ to obtain an iron oxide-zirconia-based composite oxide. However, the durability thereof is still insufficient.

SUMMARY OF THE INVENTION

The invention provides an exhaust gas purification catalyst for motor vehicles which includes an oxygen storage material utilizing $Fe_2O_3$ and has excellent durability.

The inventors have found that by making an iron oxide-zirconia-based composite oxide having OSC coexist with a lanthanoid oxide in the same catalytic coating layer, the iron contained in the iron oxide-zirconia-based composite oxide is inhibited from reacting with other catalyst materials and thereby the durability is improved.

An aspect of the invention relates to an exhaust gas purification catalyst which includes a base and a catalytic coating layer formed thereon. The exhaust gas purification catalyst includes an alumina support, a platinum-group metal, an iron oxide-zirconia-based composite oxide, and a lanthanoid oxide in the same catalytic coating layer.

In this aspect, the iron oxide-zirconia-based composite oxide may be a composite oxide which contains iron, zirconium, and a rare-earth element. The composite oxide may have a total content of $Fe_2O_3$, $ZrO_2$, and an oxide of the rare-earth element of 90 mass % or higher and a content of the iron oxide of 10 to 90 mass % in terms of $Fe_2O_3$ amount.

In the aspect, the iron oxide-zirconia-based composite oxide may contain lanthanum or yttrium as the rare-earth element.

In the aspect, a ceria-zirconia-based composite oxide may be further contained in the same catalytic coating layer.

In the aspect, a mass ratio of the lanthanoid oxide to the iron oxide-zirconia-based composite oxide may be in a range of 0.18 to 1.1.

In the aspect, the lanthanoid oxide may have a particle diameter D50, as measured by a dynamic light scattering method, of 15 μm or smaller.

In the aspect, the lanthanoid oxide may be $La_2O_3$.

In the aspect, the platinum-group metal may be supported on at least one of the alumina and the ceria-zirconia-based composite oxide.

The exhaust gas purification catalyst according to the aspect of the invention contains an iron oxide as an oxygen storage material and, despite this, has high durability because the lanthanoid oxide inhibits the iron from reacting with other catalyst materials. The exhaust gas purification catalyst according to the aspect of the invention is inhibited from decreasing in OSC when exposed to high temperatures for long.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
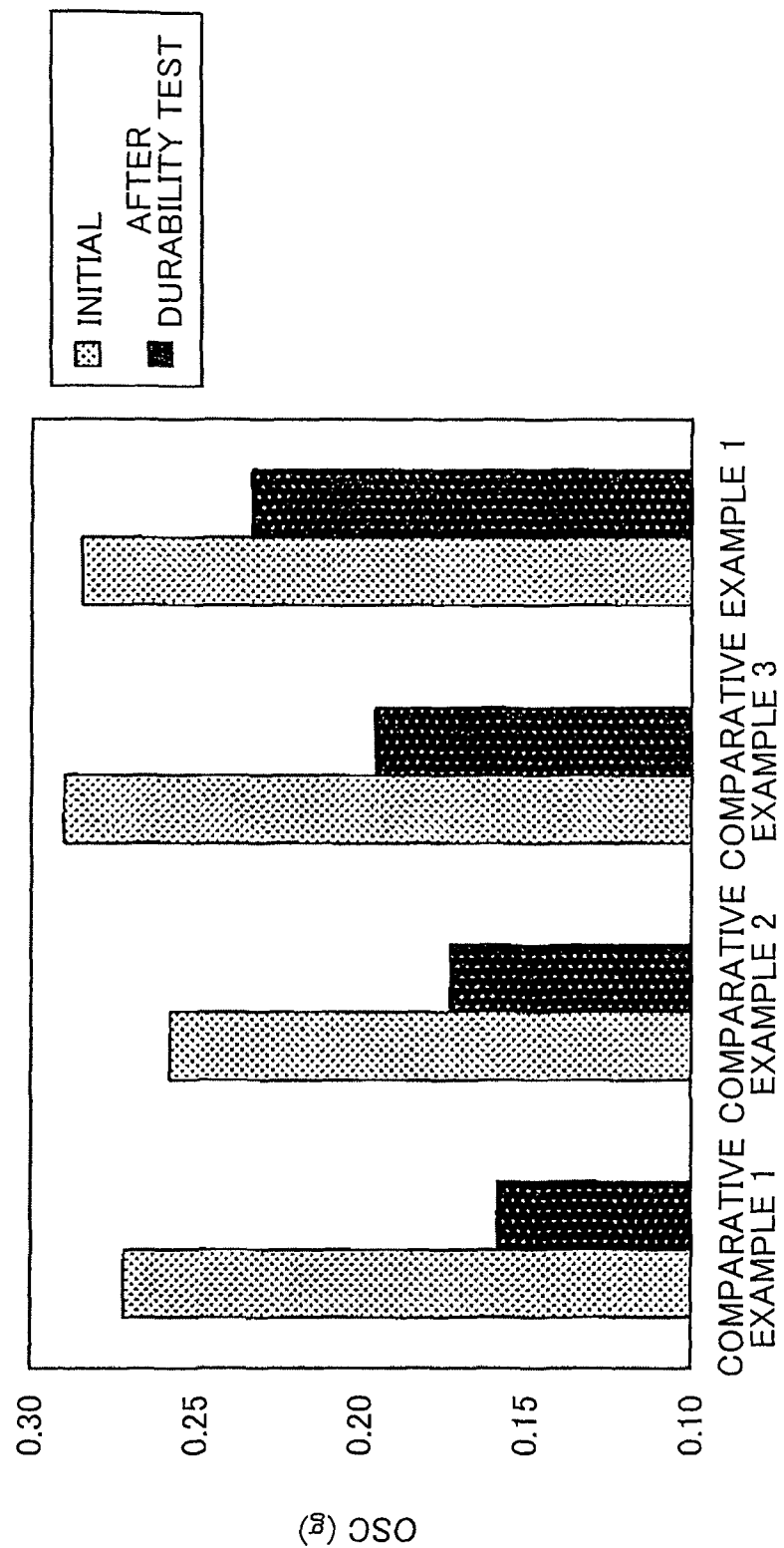
FIG. 1 is a graph which summarizes the OSC values of each catalyst measured before (initial) and after a durability test.

The exhaust gas purification catalyst according to an embodiment of the invention has a structure configured of a base which is constituted of a ceramic, metal, etc. and a catalytic coating layer formed thereon, wherein alumina, a platinum-group metal, an iron oxide-zirconia-based composite oxide, and a lanthanoid oxide coexist in the catalytic coating layer, that is, these ingredients are contained in the same catalytic coating layer.

Bases for use in exhaust gas purification catalysts are available for persons skilled in the art, and use can be made of, for example, a base having a honeycomb structure and constituted of a material having high heat resistance, such as a ceramic, e.g., cordierite or silicon carbide (SiC), or an alloy (stainless steel, etc.). An example thereof is a honeycomb base which has a cylindrical outer shape and has through-holes (cells), as exhaust gas passages, formed in the axial direction of the cylinder so that the exhaust gas can come into contact with the partitions (rib walls) separating the cells. The shape of the base can be the shape of foam, pellets, etc. besides a honeycomb shape. With respect to the overall outer shape of the base, an elliptic cylindrical shape or polygonal cylindrical shape may be adopted in place of the cylindrical shape. Conventional methods for imparting the catalytic coating layer to a base are also available for persons skilled in the art. For example, a catalytic coating layer can be formed by mixing materials for catalytic coating to prepare a slurry and pouring the slurry into a base.

The iron oxide-zirconia-based composite oxide for use in the exhaust gas purification catalyst according to an embodiment of the invention is a composite oxide which includes $LaFeO_3$ and $La_2Zr_2O_7$ (some of which is a solid solution of yttrium (Y) in $ZrO_2$) and has a primary-particle size of 1 μm or smaller and which has OSC. It is preferable that the iron oxide-zirconia-based composite oxide should further contain a rare-earth element in order to improve the heat resistance of the iron oxide and zirconia and achieve the high OSC even after a durability test performed in the air at a high temperature. In the case where the composite oxide contains a rare-earth element, it is preferable that the zirconia and an oxide of the rare-earth element should be present in a solid-solution state.

Examples of the rare-earth element include scandium (Sc), yttrium (Y), lanthanum (La), cerium (Ce), praseodymium (Pr), neodymium (Nd), samarium (Sm), gadolinium (Gd), terbium (Tb), dysprosium (Dy), ytterbium (Yb), and lutetium (Lu). Although Ce may be used, rare-earth elements other than Ce are preferred from the standpoint of reduction in Ce amount. From the standpoint that the stability (in particular, thermal stability) of the zirconia becomes high, La, Y, Nd, Pr, and Sr are more preferred, and La and Y are even more preferred. Especially preferred is La. One of such rare-earth elements may be used alone or two or more thereof may be used in combination. Consequently, La may be coexistent with Y.

It is preferable that the content of the iron oxide in terms of $Fe_2O_3$ amount in the iron oxide-zirconia-based composite oxide should be in the range of 10 to 90 mass %. In the case where the iron oxide-zirconia-based composite oxide contains no rare-earth element, it is preferable that the content of the iron oxide in terms of $Fe_2O_3$ amount be in the range of 20 to 90 mass %, in particular, 20 to 70 mass %. Meanwhile, in the case where the iron oxide-zirconia-based composite oxide contains rare-earth elements, it is preferable that the content of the iron oxide in terms of $Fe_2O_3$ amount be in the range of, in particular, 10 to 45 mass %, especially 10 to 35 mass %. Furthermore, in the case where the iron oxide-zirconia-based composite oxide contains rare-earth elements, it is preferable that the total content of $Fe_2O_3$, $ZrO_2$, and an oxide of the rare-earth element(s) be 90 mass % or higher, in particular, 95 mass % or higher, especially 98 mass % or higher, most preferably 100 mass %. So long as the iron oxide-zirconia-based composite oxide has a composition within the ranges shown above, the composite oxide can exhibit high OSC.

The iron oxide-zirconia-based composite oxide for use in the exhaust gas purification catalyst according to an embodiment of the invention is obtained, for example, by the following method. An aqueous zirconia sol suspension is mixed with an organic-acid iron salt (for example, a salt of a carboxylic acid, e.g., citric acid or fumaric acid, with an iron ion, specifically, ammonium iron(III) citrate, etc.). The obtained liquid mixture is heated and concentrated to convert the liquid mixture into a gel. The obtained gel is burned in the air at a temperature of 800° C. or higher, more preferably 900° C. or higher, especially preferably 1,000° C. or higher. Thus, an iron oxide-zirconia-based composite oxide can be prepared (mixing-and-burning method). In the case of an iron oxide-zirconia-based composite oxide containing a rare-earth element, use may be made of a method in which a compound containing the rare-earth element is further added to the liquid mixture of the aqueous zirconia sol suspension and the organic-acid iron salt. The zirconia sol has a particle diameter of preferably 10 to 100 nm, more preferably 30 to 80 nm. The content of the zirconia sol in the aqueous zirconia sol suspension is preferably 5 to 40 mass %, more preferably 10 to 40 mass %, even more preferably 20 to 35 mass %, in terms of solid concentration. The aqueous zirconia sol suspension preferably is alkaline. More preferably, the aqueous zirconia sol suspension has a pH of 8 to 10, and even more preferably, has a pH of 9 to 10.

In this mixing-and-burning method, when the liquid mixture is heated and concentrated for gelation, the zirconia sol gels and, at the same time, an iron oxide precursor yielded from the organic-acid iron salt also gels. Due to this, both the zirconia and the iron oxide become evenly dispersed on a nanometer scale. In the case where the obtained gel is burned in the air, for example, at 900° C. or higher and for 5 hours or longer, an iron oxide-zirconia-based composite oxide is obtained in which the iron oxide and the zirconia are in the state of having been evenly dispersed on a nanometer scale. This method is preferred because such a composite oxide having excellent OSC is obtained. Moreover, it is preferable that hematite be contained in the iron oxide of the thus-burned composite oxide.

In the exhaust gas purification catalyst according to the embodiment of the invention, the lanthanoid oxide exhibits the effect of inhibiting the Fe contained in the iron oxide-zirconia-based composite oxide from reacting with other materials coexistent in the catalytic coating layer. Examples of the lanthanoid include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Preferred of these are La, Nd, and Pr. Especially preferred is La. The lanthanoid oxide is preferably $La_2O_3$, $Nd_2O_3$, or $Pr_2O_3$, especially preferably $La_2O_3$.

It is preferable that in the catalytic coating layer, the lanthanoid oxide be present in such an amount that the mass ratio thereof to the iron oxide-zirconia-based composite oxide is in the range of 0.18 to 1.1, preferably 0.25 to 0.93, more preferably 0.36 to 0.79. Although the effect of the lanthanoid oxide has not been fully elucidated, it is presumed that the $La_2O_3$ within the catalytic coating layer reacts selectively with diffusing Fe and thereby reduces adverse influences on other materials. By using the lanthanoid oxide in a mass ratio within that range, the Fe can be sufficiently inhibited from reacting with other materials coexistent in the catalytic coating layer.

It is more preferable, from the standpoint of inhibiting the Fe from reacting, that the lanthanoid oxide should have been evenly dispersed in the catalytic coating layer. A general technique for quantitatively ascertaining that the lanthanoid oxide has been evenly dispersed is to polish a cross-section of the catalyst layer and analyze the cross-section with an electron probe micro analyzer (EPMA). It is preferable that the lanthanoid oxide be contained in the state of fine particles in the catalytic coating layer. The lanthanoid oxide has a particle diameter D50, as measured by a dynamic light scattering method, of preferably 15 μm or smaller, in particular, 10 μm or smaller, especially 6 μm or smaller.

In the exhaust gas purification catalyst according to the embodiment of the invention, the catalytic coating layer may further contain a ceria-zirconia-based composite oxide. Ceria-zirconia-based composite oxides are materials which are generally used as oxygen storage materials in exhaust gas purification catalysts, and details thereof are available for persons skilled in the art. The ceria-zirconia-based composite oxide for use in the exhaust gas purification catalyst of the invention is preferably one in which the zirconia is contained in a larger amount than the ceria in terms of weight ratio. More preferably, the weight ratio of ceria:zirconia in the ceria-zirconia-based composite oxide is in the range of 1:1.1 to 1:5, in particular, 1:1.5 to 1:3.

The ceria-zirconia-based composite oxide for use in the exhaust gas purification catalyst according to an embodiment of the invention may further contain elements selected from rare-earth elements other than cerium. Examples of the rare-earth elements include scandium (Sc), yttrium (Y), lanthanum (La), praseodymium (Pr), neodymium (Nd), samarium (Sm), gadolinium (Gd), terbium (Tb), dysprosium (Dy), ytterbium (Yb), and lutetium (Lu). Especially preferred of these are Y, La, and Pr. It is preferable that such rare-earth elements be contained in the form of oxides (e.g., $Y_2O_3$, $La_2O_3$, and $Pr_6O_{11}$). By adding rare-earth elements other than cerium, lattice defects are introduced and the oxygen storage performance can be improved thereby. In the case where the ceria-zirconia-based composite oxide contains elements selected from rare-earth elements other than cerium, it is preferable that the content of such element(s) be in the range of 1 to 20 mass %, especially 5 to 15 mass %, in terms of oxide amount with respect to the amount of the whole ceria-zirconia-based composite oxide, because the OSC is not impaired.

It is especially preferable that the ceria-zirconia-based composite oxide for use in the exhaust gas purification catalyst according to an embodiment of the invention should contain $Y_2O_3$ and $La_2O_3$. It is preferable that $La_2O_3$ be contained in an amount in the range of 1 to 10 mass %, especially 3 to 7 mass %, with respect to the whole ceria-zirconia-based composite oxide. It is preferable that $Y_2O_3$ be contained in an amount in the range of 1 to 10 mass %, especially 3 to 7 mass %, with respect to the whole ceria-zirconia-based composite oxide. It is preferable that the ratio of the $La_2O_3$ content to the $Y_2O_3$ content be in the range of $La_2O_3$:$Y_2O_3$=4:6 to 6:4 by weight.

The ceria-zirconia-based composite oxide for use in the exhaust gas purification catalyst according to an embodiment of the invention is not limited to those described above, and may be, for example, one in which the ceria is contained in a larger amount than the zirconia in terms of weight ratio or one which has a pyrochlore-type regular-arrangement structure. Use can be made of various ceria-zirconia-based composite oxides such as those described in, for example, Japanese Patent Application Publication No. 2013-116446 (JP 2013-116446 A).

The alumina support for use in producing the exhaust gas purification catalyst according to the embodiment of the invention can be one which is the same as the alumina support used as a support in general exhaust gas purification catalysts. The alumina support may be one which contains other compounds (typically inorganic oxides) coexistent therewith as minor components. Examples of such compounds include compounds of rare-earth elements such as lanthanum, alkaline-earth elements such as calcium, and transition metal elements. An alumina support in which a rare-earth element such as lanthanum, among those elements, is contained, as a stabilizer, in the form of an oxide such as, in particular, $La_2O_3$ is preferred from the standpoint that the specific surface area at high temperatures is enlarged without impairing the catalyst function. It is preferable that the content of minor components in the alumina support be 20 mass % or less, in particular, 10 mass % or less, especially 5 mass % or less.

The shape (outer shape) of the alumina support is not particularly limited. However, a powdery (particulate) alumina support is preferred from the standpoint that a larger specific surface area can be ensured. The particles constituting the support have a BET specific surface area of preferably 50 to 150 $m^2/g$, more preferably 80 to 120 $m^2/g$.

The exhaust gas purification catalyst according to the embodiment of the invention contains a platinum-group metal as the main catalyst. Examples of the platinum-group metal include ruthenium (Ru), rhodium (Rh), palladium (Pd), osmium (Os), iridium (Ir), and platinum (Pt). Especially preferred are Pt and Pd. The platinum-group metal is used preferably in the state of being supported on other material(s), i.e., any of the alumina, the iron oxide-zirconia-based composite oxide, the ceria-zirconia-based composite oxide, and the lanthanoid oxide, more preferably in the state of being supported on at least one of the alumina and the ceria-zirconia-based composite oxide. In the exhaust gas purification catalyst of the invention, it is preferable that the platinum-group metal be used in an amount in the range of 0.01 to 5.0 g/L, in particular, 0.1 to 2.0 g/L, with respect to the volume of the base.

EXAMPLE

The invention is explained below in more detail with reference to an Example, but the invention should not be construed as being limited to the Example.

1. Preparation of Catalysts

A. Materials

The following materials were used for preparing catalysts.

Material 1 ($Al_2O_3$): $Al_2O_3$ composited with 1 mass % $La_2O_3$

Material 2 (CZ): $CeO_2/ZrO_2/Y_2O_3/La_2O_3$ composite oxide (contents of the oxides are 30 mass %, 60 mass %, 5 mass %, and 5 mass %, respectively)

Material 3 (LFZ): $LaFeO_3/La_2Zr_2O_7/(Zr,Y)O_x$ composite oxide in which Fe:Zr:La:Y=1.0:1.0:1.2:0.109 (atomic ratio)

Material 4 ($La_2O_3$): $La_2O_3$ powder (manufactured by Kishida Chemical Co., Ltd.)

Material 5 (Pd): Aqueous palladium nitrate solution having a noble-metal content of 8.8 mass % (manufactured by Cataler Corp.)

Base: 875-cc (600H/3-9R-08) cordierite honeycomb base (manufactured by Denso Corp.)

"CZ" means a ceria-zirconia-based composite oxide, and "LFZ" means an La-containing composite oxide based on iron oxide and zirconia. The $La_2O_3$ powder as material 4 was made through milling to have a D50, measured with a dynamic light scattering (DLS) analyzer, of 6 μm. Material 3 (LFZ) was prepared in the following manner.

[Preparation of Material 3 (LFZ)]

Ammonium iron(III) citrate (manufactured by Wako Pure Chemical Industries, Ltd.; brown; iron content, 16 to 19%) was mixed with 378.4 g of an aqueous dispersion type yttria-containing alkaline zirconia sol ("NanoUse ZR30-BS" manufactured by Nissan Chemical Industries, Ltd.; sol particle diameter, 30 to 80 nm; solid $ZrO_2$ concentration, 30.8%; Zr:Y (atomic ratio)=1:0.109), 9 g of tetramethylammonium hydroxide (TMAH), and about 140 g of distilled water to prepare a mixture that contained the ammonium iron(III) citrate and zirconia sol. Next, 165.36 g of fine lanthanum oxide particles (manufactured by Kishida Chemical Co., Ltd.; particle diameter, 15 μm or smaller) were mixed with about 140 g of distilled water to prepare a dispersion of the fine lanthanum oxide particles.

The mixture was mixed with the dispersion of the fine lanthanum oxide particles, and the resultant mixture was sufficiently stirred with a propeller stirrer. Furthermore, this mixture was subjected three times to 1-minute stirring using a homogenizer ("T50-Basic" manufactured by IKA Works, Inc.; employed shaft generator "S50N-G45F" manufactured by IKA Works, Inc.) at a rotation speed of 6,000 to 7,000 rpm. Thus, an aqueous suspension containing the yttria-containing zirconia sol and the fine lanthanum oxide particles was obtained in which the ammonium iron(III) citrate had dissolved.

This aqueous suspension was heated from room temperature on a hot stirrer set at 250° C., while stirring the suspension with a propeller stirrer coated with Teflon (registered trademark), thereby concentrating the suspension. The stirring was stopped just before the time when the viscosity of the aqueous suspension became too high to continue stirring. The concentrate was put in a 120° C. drying oven together with the propeller blades and dried for 12 hours or longer. All the obtained powder was introduced into a crucible, and the crucible was put into a sagger with the lid of the crucible open by about 1/10 to 1/5 for complete oxidation of the powder. This sagger was put into a degreasing furnace capable of circulating the air. The powder was calcined in the air under the conditions of 150° C. for 3 hours→250° C. for 2 hours→400° C. for 2 hours→500° C. for 5 hours.

Thereafter, the sagger was taken out of the degreasing furnace at the time when the temperature of the degreasing furnace had fallen to 150° C. or lower. The resultant powder was pulverized using a mortar to particles that can pass through a 100-mesh (150 μm sq.) sieve. The obtained pulverized particles were introduced into a crucible, and the crucible was put into a box-shaped electric furnace with the lid of the crucible open by about 1/10 to 1/5. The pulverized particles were burned in the air at 1,100° C. for 10 hours to obtain a composite oxide powder.

The amounts of the starting materials used had been regulated so that the atomic ratio of iron, zirconium, lanthanum, and yttrium in the obtained composite oxide was 1.0:1.0:1.2:0.109. The content ratio of $Fe_2O_3$, $ZrO_2$, $La_2O_3$, and $Y_2O_3$ in the composite oxide, calculated from the amounts of the starting materials introduced, was 19.4:30.0:47.6:3.0. The obtained composite oxide had an absolute value of covariance COV(Fe, Zr+La+Y), calculated under the following conditions, of 1.9. It was thus ascertained that the iron oxide and the zirconia had been evenly dispersed. Incidentally, in the case where the absolute value of this covariance COV is 30 or less, in particular, 20 or less, the components being examined can be regarded as having been evenly dispersed.

[Math. 1]

$$R_i(Fe) = \frac{I_i(Fe) \times 100}{I_i(Fe) + I_i(Zr) + I_i(X)} \quad (1)$$

$$R_i(Zr+X) = \frac{\{I_i(Zr) + I_i(X)\} \times 100}{I_i(Fe) + I_i(Zr) + I_i(X)} \quad (2)$$

$$COV(Fe, Zr+X) = \quad (3)$$

$$\frac{1}{n}\sum_{i=1}^{n}[\{R_i(Fe) - R_{av}(Fe)\} \times \{R_i(Zr+X) - R_{av}(Zr+X)\}]$$

(In the equations, X indicates a rare-earth element; $I_i(Fe)$, $I_i(Zr)$, and $I_i(X)$ indicate the ratios of the X-ray intensities respectively for iron, zirconium, and the rare-earth element at a measurement point i (i=1 to n) to the 100% intensities respectively for the elements, the X-ray intensities being determined by examining the composite oxide with EPMA (WDX: wavelength dispersive X-ray spectroscopy) under the conditions of an accelerating voltage of 15 kV, electric current applied to the sample of 50 nA, beam diameter of minimum (1 μm or smaller), and measurement interval of 1 μm and analyzing the resultant lines; and Rav (Fe) and Rav (Zr+X) respectively indicate the averages of the Ri (Fe) values and Ri (Zr+X) values determined for all of the measurement points n.)

B. Preparation of Catalysts of Comparative Examples 1 to 3 and Example 1

(1) Comparative Example 1: Pd(1.5)/CZ(105)+ $Al_2O_3$(113)+Binder

First, material 5 (Pd) was used to prepare Pd/CZ (material 6) in which 1.42 mass % Pd had been loaded onto material 2 (CZ). The loading of the Pd was conducted by an impregnation method. Next, material 6, material 1, and an $Al_2O_3$-based binder were suspended with stirring in distilled water to prepare a slurry. This slurry was poured into the base, and the unnecessary slurry was blown away by a blower to coat the wall surfaces of the base with the materials. The coating material was prepared so that the amounts of the Pd, material 1, and material 2 were 1.5 g/L, 113 g/L, and 105 g/L, respectively, with respect to the volume of the base. Finally, the coated base was dried for 2 hours in a drying oven kept at 120° C. to remove the water therefrom, and thereafter burned in an electric furnace at 500° C. for 2 hours to obtain the catalyst of Comparative Example 1.

(2) Comparative Example 2: Pd(1.5)/CZ(105)+ $Al_2O_3$(113)+$La_2O_3$(15)+Binder

Material 4 ($La_2O_3$) was added to the slurry according to Comparative Example 1 to prepare a slurry. This slurry was used to coat the base therewith in the same manner as in Comparative Example 1, thereby producing the catalyst of Comparative Example 2. The coating material was prepared so that the amounts of the Pd, material 1, material 2, and material 4 were 1.5 g/L, 113 g/L, 105 g/L, and 15 g/L, respectively, with respect to the volume of the base.

(3) Comparative Example 3: Pd(1.5)/CZ(105)+
Al$_2$O$_3$(113)+LFZ(27.8)+Binder

Material 3 (LFZ) was added to the slurry according to Comparative Example 1 to prepare a slurry. This slurry was used to coat the base therewith in the same manner as in Comparative Example 1, thereby producing the catalyst of Comparative Example 3. The coating material was prepared so that the amounts of the Pd, material 1, material 2, and material 3 were 1.5 g/L, 113 g/L, 105 g/L, and 27.8 g/L, respectively, with respect to the volume of the base.

(4) Example 1: Pd(1.5)/CZ(105)+Al$_2$O$_3$(113)+LFZ
(27.8)+La$_2$O$_3$(15)+Binder Material 3 (LFZ) and material 4 (La$_2$O$_3$) were added to the slurry according to Comparative Example 1 to prepare a slurry. This slurry was used to coat the base therewith in the same manner as in Comparative Example 1, thereby producing the catalyst of Example 1. The coating material was prepared so that the amounts of the Pd, material 1, material 2, material 3, and material 4 were 1.5 g/L, 113 g/L, 105 g/L, 27.8 g/L, and 15 g/L, respectively, with respect to the volume of the base.

2. Catalyst Evaluation Tests (1) Durability Test

A 25-hour accelerated deterioration test was conducted at 1,000° C. (catalyst bed temperature) using an actual engine. The composition of the exhaust gas was changed so as to repeatedly undergo a rich region, a stoichiometric region, and a lean region at certain intervals by controlling the throttle opening and the engine burden, thereby accelerating the deterioration.

(2) OSC Evaluation Test

A/F feedback control was conducted using an actual engine, with 14.1 and 15.1 being set as desired values. From the difference between the value at the stoichiometric point and that outputted from an A/F sensor, an excess or deficiency in oxygen was calculated using the following equation. The maximum oxygen occlusion amount was taken as OSC value for the evaluation.

$OSC$ (g)=0.23×$\Delta A/F$×(amount of injected fuel)

(3) Test Results

In FIG. 1 is shown a graph which summarizes the OSC values of each catalyst measured before (initial) and after the durability test.

Comparative Example 2 differs from Comparative Example 1 in that the coating layer has La$_2$O$_3$ therein. However, a comparison between the two in OSC value obtained after the durability test revealed that the OSC value of Comparative Example 2 was comparable to or only slightly higher than that of Comparative Example 1.

Comparative Example 3 differs from Comparative Example 1 in that the coating layer has LFZ (iron oxide-zirconia-based composite oxide) therein. A comparison between the two in OSC value obtained after the durability test revealed that the OSC value of Comparative Example 3 was significantly higher than those of Comparative Examples 1 and 2. However, this OSC value was about half the initial value, and a further improvement is hence desired.

Example 1 differs from Comparative Example 3 in that the coating layer has La$_2$O$_3$ therein in addition to LFZ. However, the OSC value after the durability test was far more improved than that of Comparative Example 3. These results differ from the results of Comparative Example 1 and Comparative Example 2, which were different from each other only in the presence or absence of La$_2$O$_3$.

3. Investigation of Addition Amount of La$_2$O$_3$

Figure 2:
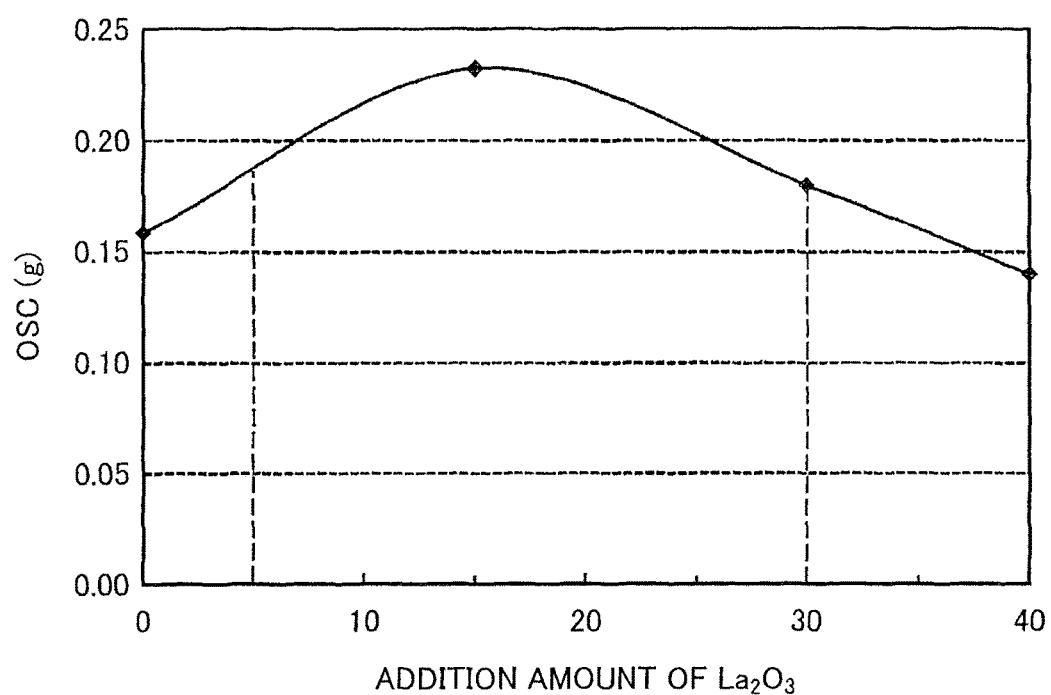
FIG. 2 is a graph which shows changes in OSC value measured after the durability test with changing $La_2O_3$ addition amount.

Catalysts were prepared in the same manner as in Example 1 described in 1. above, except that the addition amount of La$_2$O$_3$ was changed. The same evaluation tests as in 2 above were then conducted. In FIG. 2 is shown a graph which shows changes in OSC value measured after the durability test. From the test results, it was determined that an adequate range of the addition amount of La$_2$O$_3$ is 5 to 30 g.

The invention claimed is:

1. An exhaust gas purification catalyst including a substrate, and a catalytic coating layer formed thereon, the exhaust gas purification catalyst comprising:
   an alumina support, a platinum-group metal, an iron oxide-zirconia-based composite oxide, and a lanthanoid oxide in the same catalytic coating layer;
   wherein
   a mass ratio of the lanthanoid oxide to the iron oxide-zirconia-based composite oxide is in a range of 0.18 to 1.1;
   the lanthanoid oxide has a particle diameter D50, as measured by a dynamic light scattering method, of 15 μm or smaller;
   the iron oxide-zirconia-based composite oxide is a composite oxide which includes LaFeO$_3$ and La$_2$Zr$_2$O$_7$; and
   the particle diameter D50 of the lanthanoid oxide is measured in primary material before forming catalyst.

2. The exhaust gas purification catalyst according to claim 1, wherein
   a total content of Fe$_2$O$_3$, ZrO$_2$, and an oxide of the rare-earth element being 90 mass % or higher and a content of the iron oxide being 10-90 mass % in terms of Fe$_2$O$_3$ amount.

3. The exhaust gas purification catalyst according to claim 1, further comprising:
   a ceria-zirconia-based composite oxide in the same catalytic coating layer.

4. The exhaust gas purification catalyst according to claim 1, wherein
   the lanthanoid oxide is La$_2$O$_3$.

5. The exhaust gas purification catalyst according to claim 3, wherein
   the platinum-group metal is supported on at least one of the alumina and the ceria-zirconia-based composite oxide.

* * * * *